(12) United States Patent
Mehta et al.

(10) Patent No.: US 10,303,610 B2
(45) Date of Patent: May 28, 2019

(54) HIGH-BANDWIDTH PREFETCHER FOR HIGH-BANDWIDTH MEMORY

(71) Applicant: Cray Inc., Seattle, WA (US)

(72) Inventors: Sanyam Mehta, Minneapolis, MN (US); James Robert Kohn, Inver Grove Heights, MN (US); Daniel Jonathan Ernst, West St. Paul, MN (US); Heidi Lynn Poxon, Hopkins, MN (US); Luiz DeRose, Rosemount, MN (US)

(73) Assignee: Cray, Inc., Seattle, WA (US)

( * ) Notice: Subject to any disclaimer, the term of this patent is extended or adjusted under 35 U.S.C. 154(b) by 0 days.

(21) Appl. No.: 15/913,749

(22) Filed: Mar. 6, 2018

(65) Prior Publication Data

US 2019/0042435 A1 Feb. 7, 2019

Related U.S. Application Data

(63) Continuation of application No. 15/335,041, filed on Oct. 26, 2016, now Pat. No. 9,946,654.

(60) Provisional application No. 62/405,531, filed on Oct. 7, 2016, provisional application No. 62/385,857, filed on Sep. 9, 2016, provisional application No. 62/385,866, filed on Sep. 9, 2016.

(51) Int. Cl.
*G06F 12/00* (2006.01)
*G06F 12/0862* (2016.01)
*G06F 12/1045* (2016.01)
*G06F 12/0886* (2016.01)

(52) U.S. Cl.
CPC ...... *G06F 12/0862* (2013.01); *G06F 12/0886* (2013.01); *G06F 12/1054* (2013.01); *G06F 2212/1024* (2013.01); *G06F 2212/602* (2013.01); *G06F 2212/6028* (2013.01); *G06F 2212/68* (2013.01)

(58) Field of Classification Search
None
See application file for complete search history.

(56) References Cited

U.S. PATENT DOCUMENTS

| | | | | |
|---|---|---|---|---|
| 4,853,165 A | * | 8/1989 | Rosenzweig | B29C 61/003 264/450 |
| 5,146,578 A | * | 9/1992 | Zangenehpour | G06F 12/0862 711/122 |
| 7,555,609 B2 | * | 6/2009 | Duncan | G06F 12/0862 711/137 |

(Continued)

*Primary Examiner* — John A Lane
(74) *Attorney, Agent, or Firm* — Perkins Coie LLP (57) ABSTRACT

A method for prefetching data into a cache is provided. The method allocates an outstanding request buffer ("ORB"). The method stores in an address field of the ORB an address and a number of blocks. The method issues prefetch requests for a degree number of blocks starting at the address. When a prefetch response is received for all the prefetch requests, the method adjusts the address of the next block to prefetch and adjusts the number of blocks remaining to be retrieved and then issues prefetch requests for a degree number of blocks starting at the adjusted address. The prefetching pauses when a maximum distance between the reads of the prefetched blocks and the last prefetched block is reached. When a read request for a prefetched block is received, the method resumes prefetching when a resume criterion is satisfied.

20 Claims, 8 Drawing Sheets

(56) References Cited

U.S. PATENT DOCUMENTS

| | | | |
|---|---|---|---|
| 9,430,392 B2* | 8/2016 | Jain | G06F 12/0862 |
| 2009/0198909 A1* | 8/2009 | Speight | G06F 12/0862 |
| | | | 711/137 |
| 2009/0222629 A1* | 9/2009 | Yano | G06F 12/0862 |
| | | | 711/137 |
| 2016/0019155 A1* | 1/2016 | Radhakrishnan | G06F 12/0862 |
| | | | 711/137 |
| 2016/0055088 A1* | 2/2016 | Zhang | G06F 12/0862 |
| | | | 711/137 |

* cited by examiner

HIGH-BANDWIDTH PREFETCHER FOR HIGH-BANDWIDTH MEMORY

CROSS-REFERENCE TO RELATED APPLICATION(S)

This application claims the benefit of U.S. Provisional Patent Application Nos. 62/385,857 filed Sep. 9, 2016, entitled "THE PERFECT MATCH: HBP, A HIGH-BANDWIDTH PREFETCHER FOR THE HIGH-BANDWIDTH MEMORY;" 62/385,866 filed Sep. 9, 2016, entitled "THE PERFECT MATCH: HBP, A HIGH-BANDWIDTH PREFETCHER FOR THE HIGH-BANDWIDTH MEMORY;" and 62/405,531 filed Oct. 7, 2016, entitled "HIGH-BANDWIDTH PREFETCHER FOR HIGH-BANDWIDTH MEMORY," each of which is incorporated herein by reference in its entirety.

BACKGROUND

A current goal for designers of high-performance computing ("HPC") systems is to reach exascale computing, that is, exascale floating-point operations per second ("exaFLOPS"). To achieve exascale computing, designers envision an exascale computing system with many nodes, each of which has many cores. The use of many cores per node allows for increased performance through parallelization. Unfortunately, many application programs are constrained by limited memory bandwidth, even with many fewer cores in a node. As a result of the limited memory bandwidth, the memory read requests of the application programs are queued at the core, and the application programs stall while waiting for the queued read requests to be processed. One reason that the read requests are queued is that the cache into which the data is to be stored has no available outstanding request buffer ("ORB"). Whenever a memory request is to be sent to memory, an ORB is allocated to support issuing the memory request and receiving the corresponding response. If all the ORBs for a cache are allocated, the subsequent memory requests need to be queued pending deallocation of an ORB.

High-bandwidth memory ("HBM") has the potential of allowing such application programs to execute without incurring significant delays due to stalling while waiting for queued memory read requests. HBM achieves higher bandwidth while using less power in a substantially smaller form factor than other memory techniques. The high bandwidth is achieved by stacking up to eight DRAM dies, which may include a base die with a memory controller. The memory bus of an HBM memory is very wide in comparison to other DRAM memories. An HBM stack of four DRAM dies may have two 128-bit channels per die for a total of eight channels and a total width of 1024 bits. Examples of HBM include the High-Bandwidth Memory provided by Advanced Micro Devices, Inc. and the Hybrid Memory Cube provided by Micron Technology, Inc.

Unfortunately, even with HBM, significant queuing delays can still occur because application programs that execute on HPC systems commonly execute a large number of vector or single-instruction-multiple-data ("SIMD") instructions. These queuing delays can be very significant with certain memory access patterns such as a gather operation in which the consecutive elements of the vector or array are not consecutive in memory. Although HBM is theoretically capable of supporting such application programs without significant queuing delays, the number of ORBs associated with a cache can present a bottleneck, resulting in significant queue delays. Thus, if an application program has a memory access pattern that is optimally supported by 24 ORBs, but the cache has only 10 ORBs, significant queueing delays can occur. Current computer architectures typically have 10 ORBs for an L1 cache. Even application programs that do not perform gather operations may still incur significant queuing delays resulting from not enough ORBs because a vectorized loop may have many array references. Moreover, as cores support larger vector widths (e.g., 2048 bits) and support simultaneous multithreading ("SMT") (e.g., 4-way) the number of ORBs will continue to be a limiting factor.

One solution would be to add more ORBs for the cache. Unfortunately, ORBs, especially for an L1 cache, are expensive in terms of area since they are close to the core and in terms of power since each cache miss initiates a fully associative look up encompassing all the ORBs for a matching address. In summary, while HBM will support significantly increased memory parallelism, current cores are unprepared to support such memory parallelism.

DETAILED DESCRIPTION

A high-bandwidth prefetcher ("HBP") is provided that prefetches data of an application program as directed by execution of a prefetch instruction that is included in the application program. The prefetch instruction is an instruction of the instruction set of a processor. In some embodiments, the prefetch instruction directs the HBP to start prefetching a certain amount of data from memory, starting from a start address. After the HBP starts the prefetching, subsequent instructions of the application program are executed in parallel with the prefetching. For example, an application program may perform a gather operation that reads each 64th byte of an array with a size of 1M bytes. In such a case, the application program, prior to starting the gather operation, may execute the prefetch instruction with an operand specifying the start address of the array and the number of blocks (i.e., cache lines) to retrieve. If the start address of the array is 0.5M and the block size is 128 bytes, then the prefetch instruction may specify its operands to be a start address of 0.5M and a number of blocks of 8192. A prefetch instruction may be added to an application program by a programmer or by a compiler based on analysis of the code of the application program. The HBP allocates an ORB for prefetching and sets an address field of the ORB to the start address and a number of blocks field of the ORB to the number of blocks to retrieve. The HBP then issues initial prefetch requests to retrieve some number of blocks, referred to as the degree, from memory starting at the address into a cache (e.g., an L1 cache). Continuing with the example, if the degree is four, then the HBP may issue a first prefetch request for address 0.5M, a second prefetch request for address 0.5M+128, a third prefetch request for address 0.5M+256, and a fourth prefetch request for address 0.5M+384. When a prefetch response is received for all the outstanding prefetch requests, the HBP increases the address field of the ORB by the degree times the block size representing the address for the next prefetch and decreases the number of blocks field of the ORB by the degree representing the remaining number of blocks to prefetch. Continuing with the example, the HBP sets the address field of the ORB to 0.5M+512 and the number of blocks field of the ORB to 8188. If the number of blocks field of the ORB is greater than zero, the HBP continues issuing prefetch requests for the next degree blocks. This processing continues until the number of blocks field of the ORB is zero, in which case the prefetching is complete and the HBP deallocates the ORB. By specifying the number of blocks to prefetch, the prefetch instruction need be executed only once. As a result, the prefetch instruction can be moved outside of a loop that accesses the elements of an array. The moving of a prefetch instruction outside of a loop eliminates the overhead of executing a prefetch instruction during every iteration of the loop. This overhead can be especially significant for small loops.

The HBP allows an application program to specify what data to prefetch and when to start prefetching. In some embodiments, the prefetch instruction may have a degree operand so that the application program can specify the number of prefetch requests that can be outstanding. For example, if the application program sets the degree to four, the HBP will issue four prefetch requests at a time. If the application program sets the degree to eight, the HBP will issue eight prefetch requests at a time. In some embodiments, the prefetch instruction may select a maximum distance that is a fixed multiple of the degree or may have a maximum distance operand to allow the application program to specify the maximum distance. The distance represents the number of prefetch blocks that are in the cache but have not yet been read by the application program. For example, if the maximum distance is 16, the HBP will continue issuing prefetch requests (a degree number at a time) as long as the distance is less than 16. When the HBP issues a prefetch request, it increments a distance field of the ORB, and when the application program reads a prefetched block, the HBP decrements the distance field of the ORB. If the distance field of the ORB is equal to the maximum distance, the HBP pauses the issuance of prefetch requests until the application program reads more prefetched blocks. If the distance is a maximum distance and is a fixed multiple of the degree specified in the prefetch instructions, the programmer or the compiler need not perform any analysis of the application program to determine the maximum distance. The maximum distance that is selected by the prefetch instruction or specified by the maximum distance operand of the prefetch instruction may vary based on the code of the application, the design of the hardware, the level of the cache, and so on. For example, a maximum distance of four times the degree for an L1 cache may be suitable for many types of application programs. By allowing the prefetch instruction to specify the degree, the programmer or compiler can select a degree that is most appropriate given the number of arrays (more generally data streams) to be accessed simultaneously and given the maximum distance. Thus, if many arrays are accessed simultaneously, a smaller degree will result in a smaller maximum distance so that prefetching of the elements from the multiple arrays will not result in replacement in the cache of elements by other elements of the arrays before those elements are accessed by the application program.

In some embodiments, the HBP uses several fields associated with each block of the cache and several fields of an ORB. Table 1 provides a description of fields for each cache block, and Table 2 provides description of the fields for each ORB.

TABLE 1

HBP Fields in Cache Block

| Name | Description |
| --- | --- |
| prefetch | A flag that indicates whether this block was prefetched when brought in to the cache |
| read | A flag that indicates whether this block has been read at least once after being prefetched |
| orb | The identifier of the ORB that is servicing the prefetch request that was responsible for fetching this block to the cache |

TABLE 2

HBP Fields in the ORBs

| Name | Description |
| --- | --- |
| distance | A count of prefetched blocks that have not yet been read |
| maxdistance | The maximum distance (if software-controlled) |
| degree | The number of blocks to be prefetched at once (if software-controlled) |
| pause | A flag that indicates whether the prefetching is paused |
| nblocks | The number of blocks that remain to be prefetched from the original number of requested blocks in the prefetch request |
| IsHBP | A flag that indicates that the ORB is used for prefetching |
| vaddr | The most significant bits of the virtual address of the first block being prefetched (i.e., at a degree boundary) |
| paddr | The most significant bits of the physical address of the first block being prefetched (i.e., at a degree boundary) |
| lookup | The number of ORB lookups since last activity in this ORB |
| incache | A flag that indicates whether all the prefetched blocks were already in the cache |

In some embodiments, the degree and the maximum distance are restricted to being a power of two. The HBP also aligns the address at which the HBP is to start prefetching to a block boundary that is a multiple of the degree, which is referred to as a degree boundary. For example, if the block size is 128 and the degree is four, the degree boundaries are addresses 0, 512, 1024, 1536, 2048, and so on. This allows for more efficient determination (e.g., using less logic and being faster) of whether an address is currently being prefetched by comparing the most significant bits of the address to the most significant bits of an address field of an ORB. Also, since the address of the prefetch instruction is a virtual address, the HBP needs to identify when the virtual address increases to a new page. In such a case, the HBP determines the corresponding physical address of the new page using, for example, a translation lookaside buffer ("TLB"). The aligning of the addresses to a degree boundary also allows for more efficient determination of whether the virtual address is increased to a new page based on whether the least significant bits are all zero.

With certain multiprocessing systems, an ORB associated with a core that is allocated for a first prefetch instruction of a first process executing on the core may be allocated to a second prefetch instruction of a second process as a result of a process switch that allows the second process to execute on the core. In such a case, when the first process resumes its execution on the core (or even on a different core), the prefetching of the first prefetch instruction will not be resumed. If the first prefetch instruction is located outside of a loop to avoid the overhead of executing a prefetch instruction during every iteration of the loop as described above and a process switch occurs during the loop, the remaining iterations of the loop will not have the benefit of the prefetching when execution of the first process resumes. To avoid losing the benefit of the prefetching, an operating system may save the state of the ORBs used for prefetching as part of the context or state of a process. When the process is to resume execution, the operating system may execute a prefetch instruction to resume prefetching for the process. Alternatively, if the operating system does not support resuming prefetching, a programmer or a compiler may modify the loop so that it includes an outer loop and an inner loop using a loop tiling or strip mining technique. For example, if the loop is to be executed 1,000,000 times, then the outer loop may specify 50 iterations and the inner loop may specify 20,000 iterations. Rather than being located outside of the outer loop, the prefetch instruction may be located inside the outer loop, but before the inner loop. In such a case, if a process switch occurs during execution of the loop, a prefetch instruction will be executed prior to the start of the next execution of the inner loop. Thus, the loop will have the benefit of prefetching for the subsequent iterations of the outer loop after the process resumes execution. Also, if a thread is created for each iteration of the outer loop, then each thread will execute its own prefetch instruction before executing the inner loop. Each thread will thus have the benefit of prefetching. The inner loop that is executed by each thread may also modified to have a further nested loop with a prefetch instruction that is executed for each iteration of the inner loop to allow the benefit of prefetching after execution of the thread resumes after a process or thread switch.

In some embodiments, the HBP may deallocate an ORB, which is allocated for a first prefetch instruction of an application program, before all the blocks that have been prefeteched have been read by the application program. The ORB may be deallocated, for example, because all the blocks have been prefetched or because the ORB has not been used recently to issue prefetch requests (e.g., the application program has exited a loop before reading all the data prefetched for the loop). If the HBP then allocates the deallocated ORB to a second prefetch instruction (e.g., for the same or different application program), then the HBP may not be able to distinguish whether a read of data in the cache is a read of data prefetched by the first prefetch instruction or the second prefetch instruction. As a result, the HBP would not know to whether to update or not update distance field in the ORB that is now allocated to the second prefetch instruction. So, the HBP may update the distance field when data of a prefetched block is read only when the physical address of the data being read and the physical address field of the ORB are on the same page. The HBP ensures that the calculated distance is greater than zero and not greater than the maximum distance because the physical address of the data being read may be greater than or may be much less than the physical address field of the ORB. Since the HBP does not update distance when the physical address field of the ORB and physical data of the data being read are not on the same page, the HBP would continue prefetching at a new page even if the actual distance exceeds the maximum distance. To avoid this continued prefetching, the HBP suppresses prefetching until the reads catch up with the prefetching. To avoid the delay in prefetching blocks at the beginning of a page when the reads eventually catch up and to avoid normal catch processing (described below), the HBP may prefetch the next degree blocks at the beginning of a new page irrespective of the distance field of the ORB. So, when the reads reach the new page, the first blocks of the new page will have been prefetched to avoid any delay and any catch up processing. The HBP will also start updating the distance field of the ORB when the reads reach the new page and no longer suppress the prefetching. Alternatively, when an ORB is to be allocated, the HBP may clear the prefetch field of each block in the cache whose orb field indicates that the block contains data prefetched for that ORB. In this way, the HBP will handle each read to such a block as if it was not prefetched and not update any ORB.

Figure 1:
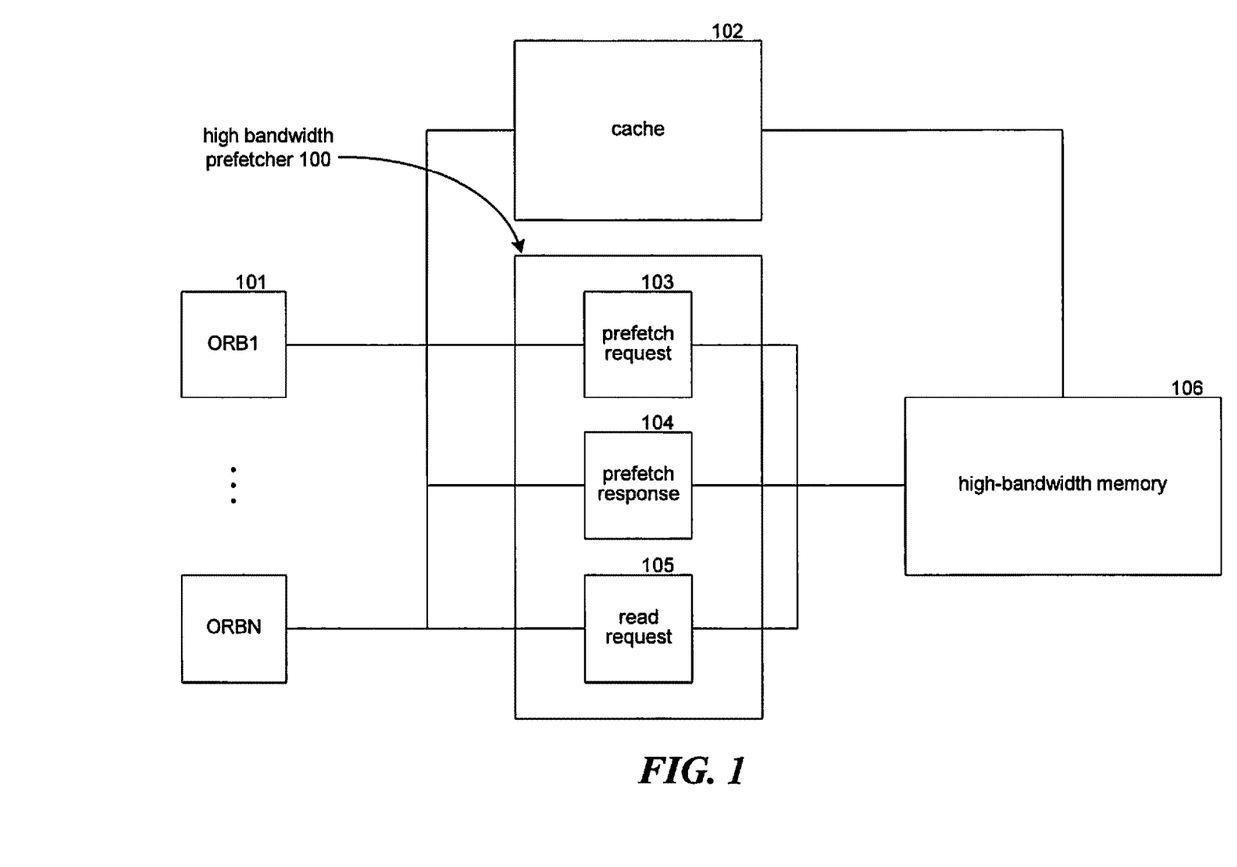
FIG. 1 is a block diagram that illustrates logic components of a high-bandwidth prefetcher in some embodiments.

FIG. 1 is a block diagram that illustrates logic components of a high-bandwidth prefetcher in some embodiments. A high-bandwidth prefetcher 100 includes prefetch request logic 103, prefetch response logic 104, and read request logic 105. The high-bandwidth prefetcher is coupled to ORBs 101, a cache 102, and a high-bandwidth memory 106. The prefetch request logic is executed during execution of a software prefetch instruction to allocate an ORB and issue the initial prefetch requests for the instruction. The prefetch response logic is executed when a response to a prefetch request is received and issues additional prefetch requests for the instruction or pauses the issuance of prefetch requests based on the distance. The ORBs contain information to track outstanding requests to the high-bandwidth memory. The cache stores the retrieved blocks along with per-block fields to track characteristics of the retrieved blocks.

Figure 2:
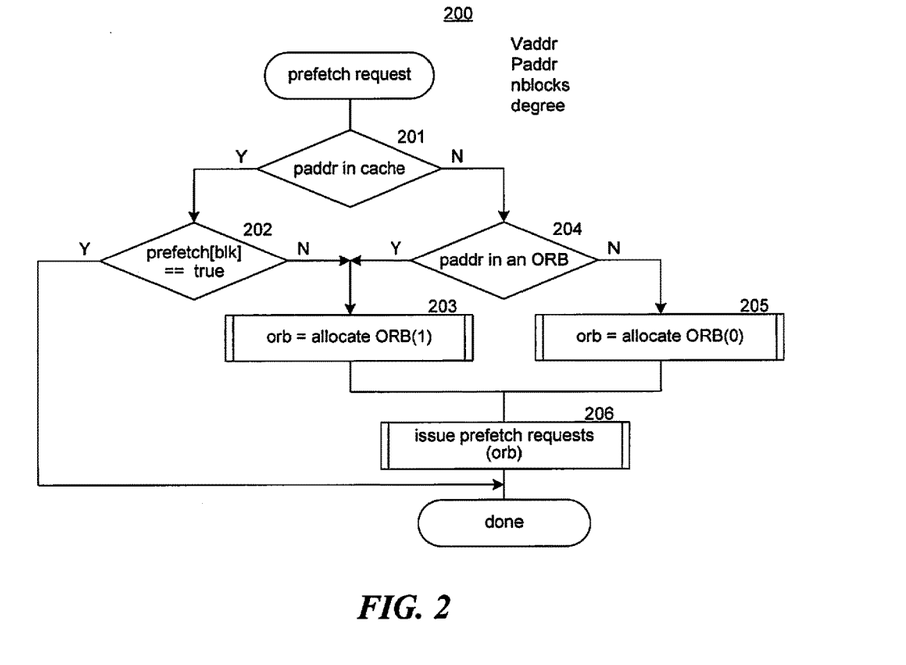
FIG. 2 is a flow diagram that illustrates the processing of the prefetch request logic in some embodiments.

FIG. 2 is a flow diagram that illustrates the processing of the prefetch request logic in some embodiments. Prefetch request logic 200 is executed during initial execution of a software prefetch instruction. The logic inputs a virtual address, a physical address, a number of blocks, and optionally a degree and/or a maximum distance. In decision step 201, if the physical address is already in the cache, then the logic continues at step 202, else the logic continues at step 204. In decision step 202, the logic determines whether the block that is in the cache (i.e., blk) was loaded into the cache as a result of the execution of a software prefetch instruction. If so, the logic completes, and if not, it continues to step 203. The logic completes because there is an overlap of the current software prefetch instruction and another software prefetch instruction. In such a case, the prefetch instruction is to some extent redundant with another prefetch instruction. In step 203, the logic executes allocate ORB logic with an indicator to skip the prefetching of the first block, which is already in the cache, * to allocate an ORB represented as "orb." In such a case, the prefetching may still be useful but the logic skips the prefetching of the first block. In decision step 204, the logic determines whether the physical address is in an ORB, which means that the prefetching of the first block can be skipped because there is an outstanding request to retrieve that block. (Alternatively, the logic may determine whether any of the first degree blocks are in the ORB and skip the prefetching of the first degree blocks.) If the physical address is in the ORB, the logic continues at step 203, else the logic continues at step 205. Thus, the allocate ORB logic of step 203 is also executed with an indicator to skip the first block when the block at the physical address is not in the cache, but there is an outstanding request to retrieve that block. In step 205, the logic executes the allocate ORB logic with an indicator not to skip the prefetching of any blocks. In step 206, the logic executes issue prefetch requests logic to issue prefetch requests using the data of the allocated ORB and then completes.

Figure 3:
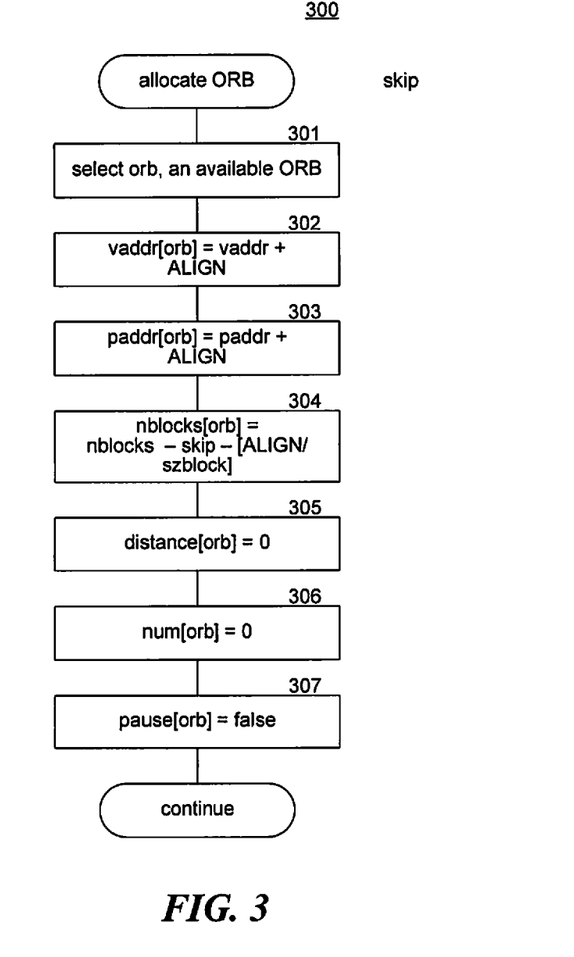
FIG. 3 is a flow diagram that illustrates the processing of allocate ORB logic in some embodiments.

FIG. 3 is a flow diagram that illustrates the processing of allocate ORB logic in some embodiments. Allocate ORB logic 300 is executed to select an ORB and initialize it based on the operands of a software prefetch instruction and a value ("skip") of 0 or 1 indicating whether to skip the prefetching of the first block. In step 301, the logic selects an available (e.g., not allocated) ORB. If an ORB is not available, the logic may queue the execution of the software prefetch instruction or may select an ORB to deallocate based on a selection criterion that may be based on the number of blocks to be prefetched by the ORB. In step 302, the logic sets the virtual address field of the selected ORB to the starting virtual address of the instruction plus an alignment factor ("ALIGN"). The alignment factor aligns the virtual address to the next degree boundary. For example, if the degree is 4, a block is 128 bytes, and an actual starting virtual address (i.e., the starting virtual address plus skip times the block size) is 1088, then the alignment factor would be 448 to align to the degree boundary of 1536. The value of 448 aligns the virtual address to the next block (i.e., 1088+64=1152) and aligns to the next degree boundary (i.e., 1152+384=1536). This aligning ensures that no data before the starting virtual address or after the number of blocks from the starting virtual address are prefetched. The virtual address could be aligned to the prior degree boundary if it is within the address space of the process in which the software prefetch instruction executes. In step 303, the logic sets the physical address field of the selected ORB to the starting physical address corresponding to the starting virtual address plus an alignment factor. If the alignment factor causes the starting virtual address to be at a page boundary, then the logic sets the physical address field to the physical address retrieved from the TLB for the starting virtual address. If the virtual address of the instruction was already aligned at a degree boundary, then the logic of steps 302-303 need not be executed unless the first block is to be skipped. In step 304, the logic sets the number of blocks field of the selected ORB to the number of blocks corresponding to the number of blocks to be read of the instruction minus skip minus the ceiling of the alignment factor divided by the block size. Continuing with the example, the ceiling of 448 divided by 128 is 3. If the number of blocks to prefetch specified by the prefetch instruction is 50 and skip is 0, then the number of blocks field would be set to 47. As a result, no data beyond the number of blocks from the starting virtual address are prefetched. In step 305, the logic initializes the distance field of the selected ORB to zero. In step 306, the logic initializes the number field of the selected ORB to zero. In step 307, the logic initializes the pause field of the selected ORB to false and continues execution of the prefetch request logic.

Figure 4:
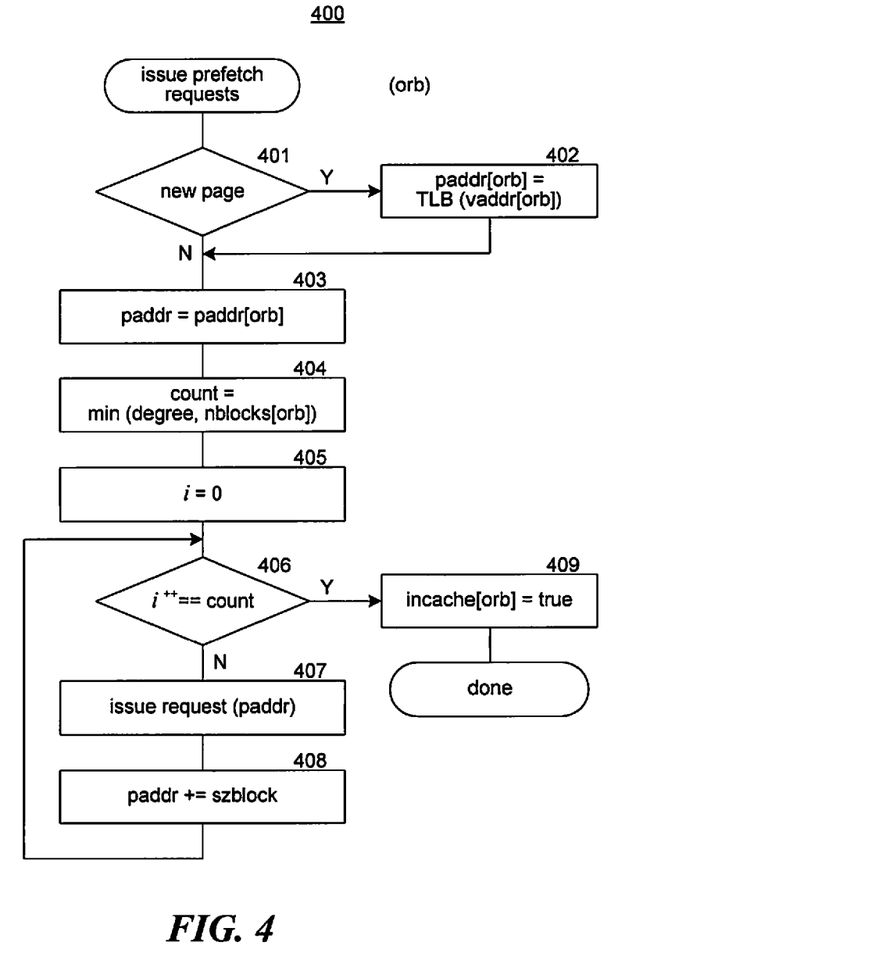
FIG. 4 is a block diagram that illustrates the processing of issue prefetch requests logic in some embodiments.

FIG. 4 is a block diagram that illustrates the processing of issue prefetch requests logic in some embodiments. Issue prefetch requests logic 400 is executed to issue prefetch requests based on an indicated ORB. In decision step 401, if the physical address of the ORB is at a page boundary, then the logic continues at step 402, else the logic continues at step 403. The logic determines whether the physical address is aligned to a page boundary when the $log_2$(page size) number of least significant bits of the physical address of the ORB is set to zero. In step 402, the logic sets the physical address field of the ORB to that retrieved from a TLB. In step 403, the logic sets a physical address value to the physical address of the ORB. In step 404, the logic sets a count value to the minimum of degree and the number of blocks in the ORB. This ensures that prefetch requests will be issued for no more than the remaining number of blocks of the ORB. In step 405, the logic initializes an index value to track the number of prefetch requests that are issued. In steps 406-408, the logic issues requests for the count value of blocks. In decision step 406, if the index value is equal to the count value, then the logic continues at step 409, else the logic continues at step 407. Step 406 also post increments the index value. In step 407, the logic issues a prefetch request for the physical address value. In block 408, the logic increments the physical address value by the block size and continues at step 406. In step 409, the logic sets an incache field of the ORB to true and then completes.

Figure 5A:
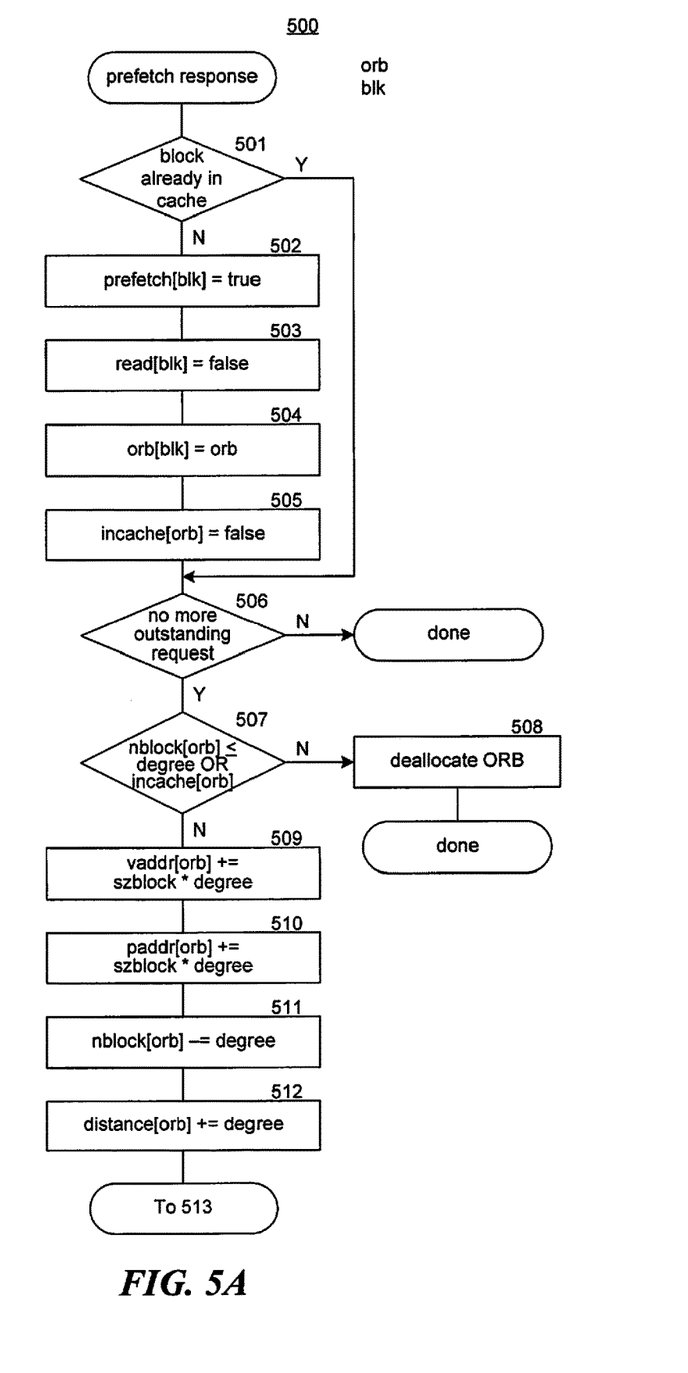
FIGS. 5A and 5B compose a flow diagram that illustrates the processing of prefetch response logic in some embodiments.
Figure 5B:
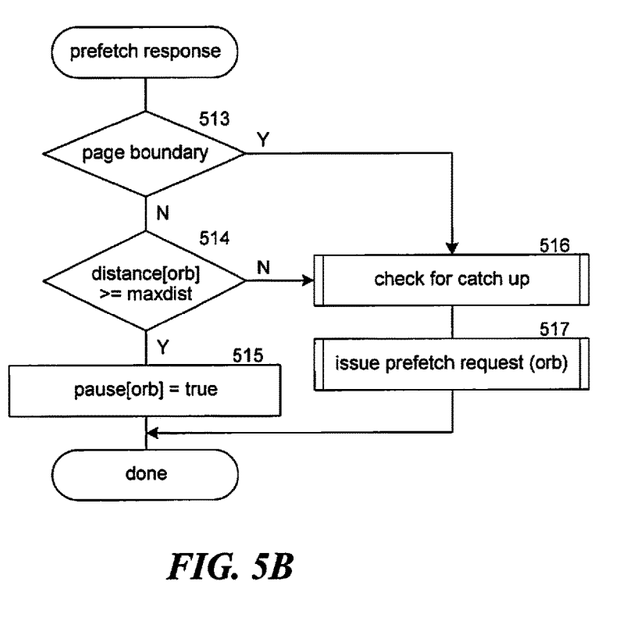

FIGS. 5A and 5B compose a flow diagram that illustrates the processing of prefetch response logic in some embodiments. Prefetch response logic 500 is executed when a prefetch response to a prefetch request is signaled. The prefetch response indicates the corresponding ORB and the block in the cache that contains the prefetched block. In decision step 501, the logic determines whether the block that was the target of the prefetch request was already in the cache. If so, the logic continues at block 506, else the logic continues at block 502. In block 502, the logic sets the prefetch field of the block to true. In block 503, the logic sets the read field of the block to false. In block 504, the logic sets the orb field of the block to the identifier of the ORB. In block 505, the logic sets the incache field of the ORB to false. In decision step 506, if there are no more outstanding prefetch requests, then the logic continues at step 507, else the logic completes. In decision step 507, if the number of blocks field of the ORB is less than or equal to the degree or the incache field of the ORB is true, then the logic continues at step 508, else the logic continues at step 509. If the number of blocks field of the ORB is less than or equal to the degree, then all the blocks of the prefetch instruction have been processed. If the incache field of the ORB is true, then a useful criterion for the prefetching is not satisfied because all the most recently prefetched blocks were already in the cache and the further prefetching of blocks for that prefetch instruction may be useless. So, in step 508, the logic deallocates the ORB and then completes. In step 509, the logic increases the virtual address field of the ORB by the block size times the degree to point to the next block to be prefetched. In step 510, the logic increases the physical address field of the ORB by the block size times the degree. In step 511, the logic decreases the number of blocks field of the ORB by the degree. In step 512, the logic increments the distance field of the ORB by the degree and continues at step 513 of FIG. 5B. In decision step 513, the logic determines whether physical address of the ORB is at a page boundary (i.e., a new page). If so, the logic continues at step 516, else the logic continues at step 514. In decision step 514, the logic determines whether the distance of the ORB is greater than or equal to the maximum distance, which indicates that the prefetching is the maximum distance number of blocks ahead of the read requests of the application program. If so, the logic continues at step 515, else the logic continues at step 516. In step 515, the logic sets the pause field of the ORB to true to indicate to pause the issuing of prefetch requests until the distance is reduced and then completes. In step 516, the logic executes check-for-catch-up logic to check for a condition in which the read requests have caught up with the prefetches of the ORB. In step 517, the logic executes the issue prefetch request logic for the ORB and then completes.

Figure 6:
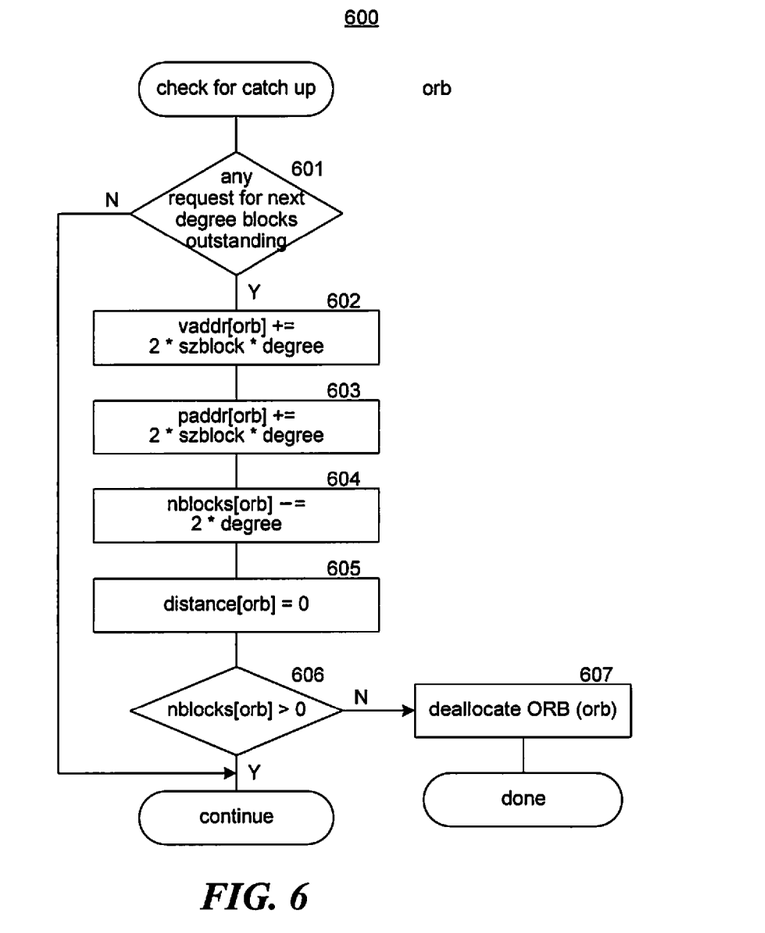
FIG. 6 is a flow diagram that illustrates the processing of check-for-catch-up logic in some embodiments.

FIG. 6 is a flow diagram that illustrates the processing of check-for-catch-up logic in some embodiments. Check-forcatch-up logic 600 checks whether the read requests of the application program have caught up with the prefetches of an indicated ORB and, if so, advances the addresses so that the prefetching can continue ahead of the read requests. In decision step 601, the logic determines whether there are any outstanding requests for the next degree blocks to be retrieved for the ORB. If there are such outstanding requests, then the software read requests have caught up to the prefetching of the prefetch instruction and the logic advances the prefetching to stay ahead of the read requests. The logic determines whether there are any such outstanding requests by comparing the most significant bits of the physical address field of the ORB to those of the physical address of the read requests. The most significant bits exclude the $\log_2$(degree) number of least significant bits. If the read requests have caught up, then the logic continues at step 602, else the logic continues at step 516. In block 602, the logic increases the virtual address field of the ORB by two times the size of the block times the degree. In step 603, the logic increases the physical address field of the ORB by two times the size of the block times the degree and if at a new page boundary, retrieves the physical address for the virtual address from the TLB. The addresses may be increased by other amounts as needed. For example, if the read requests are continually catching up, then the addresses may be increased by a larger multiple of the degree. In step 604, the logic decreases the number of blocks field of the ORB by two times the degree. In step 605, the logic sets the distance field of the ORB to zero because the read requests have caught up. In decision step 606, the logic determines whether the number of blocks field of the ORB is greater than zero, which indicates that more blocks need to be prefetched. If the number of blocks is greater than zero, then the logic continues at step 516 or step 709, else the logic continues at step 607. In step 607, the logic deallocates the ORB and then completes.

Figure 7:
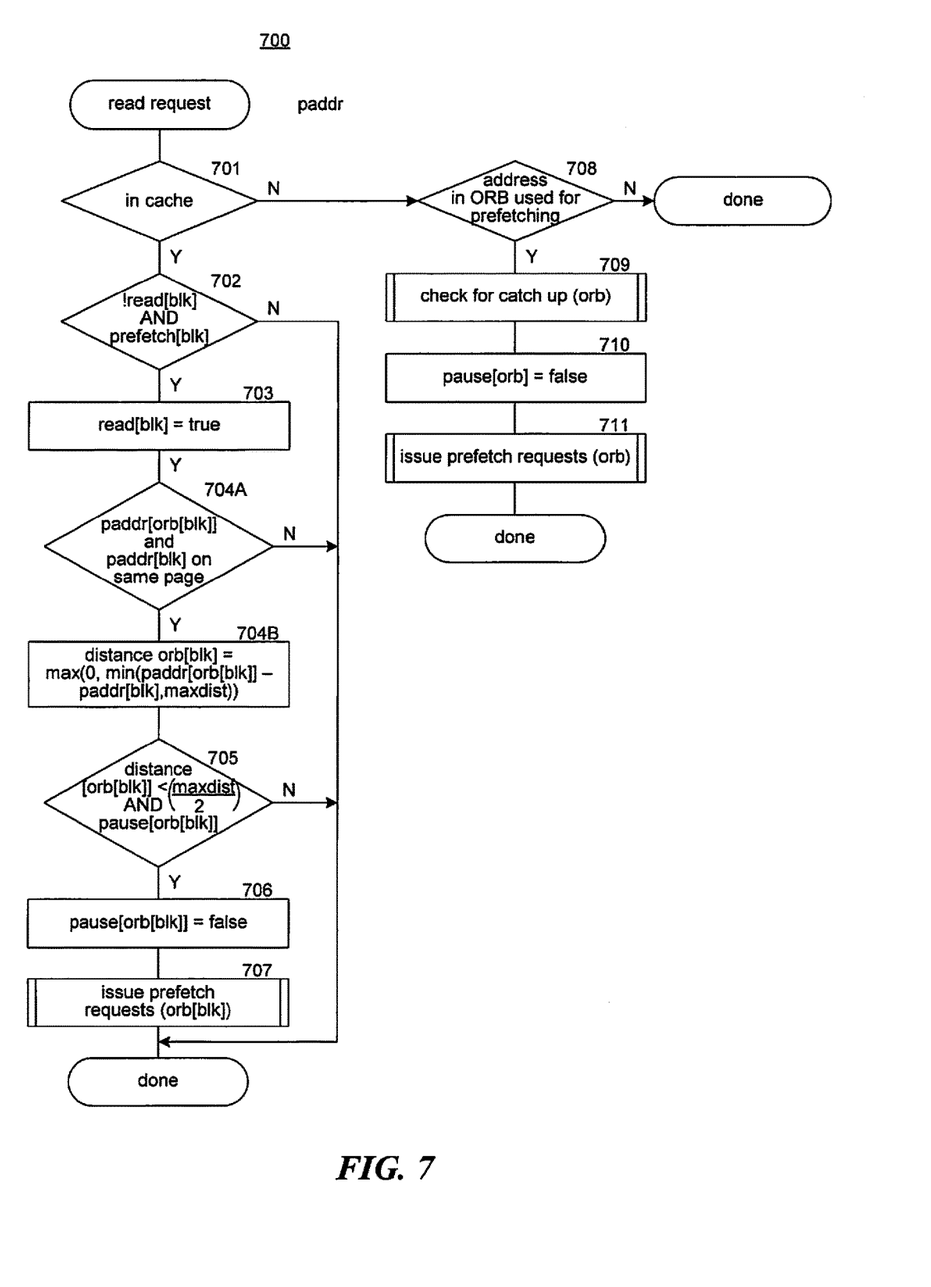
FIG. 7 is a flow diagram that illustrates the processing of read request logic in some embodiments.

FIG. 7 is a flow diagram that illustrates the processing of read request logic in some embodiments. Read request logic 700 is executed to process a read request for an indicated physical address. If the read request is for data in a block that has been prefetched, then the logic indicates that the block has been read and resumes prefetching if prefetching is paused and a resume criterion is satisfied. If the read request is for data that is not in the cache, and if the read request is related to prefetching, then the read requests may be lagging the prefetching so much that the block was replaced or the read requests may have caught up to the prefetching. If the read requests have caught up to the prefetching, the logic advances the prefetching. In decision step 701, the logic determines whether the block containing the data for the physical address is in the cache. If so, the logic continues at step 702, else the logic continues at step 708. In decision step 702, if the read field of that block is false and the prefetch field for the block is true, then the logic continues at step 703, else the logic completes because the read request is for a block that was not prefetched or that was prefetched and previously read. In step 703 the logic sets the read field of the block to true. In decision step 704A, if the physical address field of the ORB for the block and the physical address field of the block are on the same page, then the logic continues at step 704B, else the logic completes. In step 704B, the logic sets distance field of the ORB for the block to the maximum of zero and the minimum of the physical address field of the ORB for the block minus the physical address field of the block and the maximum distance. In decision step 705, if the distance field of the ORB for the block satisfies a resume criterion (e.g., the distance is less than or equal to the maximum distance divided by two) and the pause field of the ORB for the block is true, then the logic continues at step 706, else the logic completes. The logic may also reduce the maximum distance to reduce the chances of a prefetched block from being replaced in cache before it is read by the application program. In step 706, the logic sets the pause flag of the ORB for the block to false. In step 707, the logic executes the issue prefetch requests logic for the ORB for the block and then completes. In decision step 708, the logic determines whether the address of the read request is within a block of an ORB that is used for prefetching. The logic makes this determination by checking the prefetch field of the ORBs and comparing the most significant bits of the physical address field of the ORBs to those of the physical address of the read request. The most significant bits exclude the $\log_2$(block size) number of least significant bits. If the prefetch flag is true and the most significant bits match, then either the read requests are lagging the prefetching so much that the prefetched block in the cache was replaced or the read requests have caught up to the prefetching. If the read address of the read request is within a block of an ORB used for prefetching, then the logic continues at step 709, else the logic completes. In step 709, the logic executes the check-for-catch-up logic for the ORB to advance the prefetching if the read requests have caught up. In step 710, the logic sets the pause field of the ORB to false to resume prefetching if it was paused. In step 711, the logic executes the issue prefetch requests logic for the ORB and then completes.

In some embodiments, the HBP employs additional logic (not shown in the Figures) to deallocate an ORB that would otherwise never be deallocated. If the prefetching is paused and the application program stops reading prefetched data, then the HBP will never execute the prefetch response logic or the read response logic for that ORB. As a result, the ORB would never be deallocated. To prevent such a failure to deallocate an ORB, the HBP increments a lookup field of an ORB whenever the ORB is accessed to determine whether the ORB has an outstanding request for a physical address. The HBP resets the lookup field whenever the HBP updates a field of the ORB indicating that the ORB is still being used. If the HBP increments the lookup field of an ORB to a maximum lookup, then the ORB is deallocated.

The following paragraphs describe various embodiments of aspects of the HBP. An implementation of the HBP may employ any combination of the embodiments.

A duplicated copy of the claims to be inserted after inventor review.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. In some embodiments, the operand of the prefetch instruction that specified an amount of data to prefetch may be designated as some other unit, such as number of bytes, rather than number of blocks. In such case, the HBP may convert the amount of data to numbers of blocks. In some embodiments, the HBP may be implemented in a processor as computer logic via discrete logic or microcode. The HBP may be employed to prefetch various levels of cache such as L1, L2, L3, and so on. The HBP may also be employed to prefetch from memory that is not high-bandwidth such as double data rate ("DDR") synchronous dynamic random-access memory ("SDRAM"). Accordingly, the invention is not limited except as by the appended claims.

The invention claimed is:

1. A method for prefetching data into a cache, the method comprising:
during execution of a prefetch instruction that specifies a start address,
issuing a prefetch request to retrieve a block at a prefetch address that is derived from the start address; and
for one or more next blocks, issuing a prefetch request to retrieve the next block, the next block at a next prefetch address, the next prefetch address being derived from the prior prefetch address, the prior prefetch address associated with prior retrieval of a block.

2. The method of claim 1 wherein the prefetch instruction specifies a number of blocks and wherein the specified number of blocks are retrieved.

3. The method of claim 2 wherein the prefetch instruction specifies a degree and wherein prefetch requests are issued for the degree number of blocks when a next block is to be retrieved.

4. The method of claim 3 wherein the prefetch instruction specifies a maximum distance that indicates the maximum number of retrieved blocks that are in the cache but have not yet been accessed.

5. The method of claim 1 wherein the prefetch instruction specifies a degree and wherein prefetch requests are issued for the degree number of blocks when a next block is to be retrieved.

6. The method of claim 1 wherein the prefetch instruction specifies a maximum distance that indicates the maximum number of retrieved blocks that are in the cache but have not yet been accessed.

7. The method of claim 1 wherein the prefetch instruction specifies a number of blocks and further comprising:
when a prefetch response is received for a prefetch request,
setting the next prefetch address; and
setting a number of blocks remaining to retrieve based on the number of blocks that have been retrieved
wherein the prefetch request to retrieve the next block is issued in response to receiving the prefetch response.

8. The method of claim 1 wherein the prefetch instruction specifies a degree and further comprising:
when a prefetch response is received for a prefetch request,
setting the prefetch address;
setting a number of blocks remaining to retrieve based on the number of blocks for which prefetch requests have been issued; and
wherein prefetch requests for a degree number of blocks are issued in response to receiving the prefetch response.

9. The method of claim 1 wherein the prefetch instruction includes a number of blocks and the prefetch instruction is inserted into a program by a compiler that:
analyzes the program to select the number of blocks to prefetch; and
inserts into the program the prefetch instruction so that during execution of the prefetch instruction prefetch requests will be issued to retrieve the number of blocks.

10. The method of claim 1 wherein the prefetch instruction specifies a degree and the prefetch instruction is inserted into a program by a compiler that:
analyzes the program to select the degree; and
inserts into the program the prefetch instruction so that during execution of the prefetch instruction prefetch requests will be issued to retrieve a degree number of blocks when a next block is to be retrieved.

11. The method of claim 10 wherein the degree is selected factoring in a number of arrays to be accessed by the program.

12. The method of claim 10 wherein the degree is selected factoring a maximum distance that specifies the maximum number of retrieved blocks that are in the cache but have not yet been accessed.

13. The method of claim 1 further comprising:
under control of an operating system,
launching execution of a program as a process, the program having the prefetch instruction, the prefetch instruction that when executed accesses an outstanding request buffer ("ORB") out of one or more ORBs for storing state of execution of the prefetch instruction;
suspending executing of the process;
saving the state of the prefetch instruction stored in the ORB;
when execution of the process is to resume,
executing a prefetch instruction to resume prefetching for the process based on saved state; and
resuming execution of the process.

14. The method of claim 1 further comprising:
under control of an operating system,
suspending executing of a process that includes a prefetch instruction that has not completed its execution;
saving the state of the prefetch instruction;
when execution of the process is to resume,
executing a prefetch instruction to resume prefetching for the process based on saved state; and
resuming execution of the process.

15. The method of claim 1 wherein the prefetch instruction is an outer prefetch or an inner prefetch instruction of a program that replaces an original prefetch instruction of the program and wherein the original prefetch instruction is replaced by a compiler that:
analyzes the program to identify an original loop having the original prefetch instruction for execution prior to execution of the original loop, the original prefetch instruction for prefetching data accessed during execution of the original loop, the original loop having an original body and an original iteration count; and
replacing the original prefetch instruction and the original loop with an outer loop and an inner loop to modify the program, the outer loop having an outer body and an outer iteration count, the outer body including an outer prefetch instruction and the inner loop, the inner loop for execution of the original body and having an inner iteration count that is less than the original iteration count
so that a process executing the program with the outer prefetch instruction and the outer loop will resume prefetching when the outer prefetch instruction is next executed after being suspended during execution of the inner loop.

16. Computer logic for prefetching data, the computer logic comprising:

issue prefetch request logic that during execution of a prefetch instruction that specifies a start address,
    issues a prefetch request to retrieve a block at an initial prefetch address that is derived from the start address; and
    for one or more blocks, issues a prefetch request to retrieve a next block, a next block at a next prefetch address, the next prefetch address being derived from the prior prefetch address, the prior prefetch address associated with prior retrieval of a block.

17. The computer logic of claim 16 wherein the prefetch instruction specifies one or more of a number of blocks that are to be retrieved and a degree.

18. The computer logic of claim 16 wherein the prefetch instruction specifies a maximum distance that indicates the maximum number of retrieved blocks that have been retrieved but have not yet been accessed.

19. The computer logic of claim 16 wherein the prefetch instruction specifies a number of blocks and further comprising:

response logic that when a prefetch response is received for a prefetch request,
        sets the next prefetch address; and
        sets a number of blocks remaining to retrieved based on the number of blocks that have been retrieved
    wherein the prefetch request to retrieve the next block is issued in response to receiving the prefetch response.

20. The computer logic of claim 16 wherein the prefetch instruction specifies a degree and further comprising:

response logic that when a prefetch response is received for a prefetch request,
        sets the prefetch address; and
        sets a number of blocks remaining to retrieve based on the number of blocks for which prefetch requests have been issued; and
    wherein a degree number of prefetch requests are issued in response to receiving the prefetch response to retrieve the degree number of block.

* * * * *